United States Patent [19]
Yao

[11] Patent Number: 5,800,878
[45] Date of Patent: Sep. 1, 1998

[54] REDUCING HYDROGEN CONCENTRATION IN PECVD AMORPHOUS SILICON CARBIDE FILMS

[75] Inventor: Xiang Yu Yao, Milpitas, Calif.

[73] Assignee: Applied Materials, Inc., Santa Clara, Calif.

[21] Appl. No.: 738,137

[22] Filed: Oct. 24, 1996

[51] Int. Cl.$^6$ ................................................. H01L 21/20
[52] U.S. Cl. ........................... 427/573; 427/574; 427/577; 427/578; 438/479; 438/931
[58] Field of Search .............................. 427/574, 577, 427/578, 573; 438/479, 931

[56] References Cited

U.S. PATENT DOCUMENTS

| | | | |
|---|---|---|---|
| 4,854,263 | 8/1989 | Chang et al. | 118/715 |
| 4,872,947 | 10/1989 | Wang et al. | 216/38 |
| 4,998,267 | 3/1991 | Lee et al. | 378/35 |
| 5,052,339 | 10/1991 | Vakerlis | 118/723 |
| 5,068,124 | 11/1991 | Batey et al. | 427/579 |
| 5,133,986 | 7/1992 | Blum et al. | 427/569 |
| 5,162,133 | 11/1992 | Bartha | 427/577 |
| 5,356,722 | 10/1994 | Nguyen | 427/574 |
| 5,441,768 | 8/1995 | Law et al. | 438/482 |
| 5,460,689 | 10/1995 | Raiijmakers et al. | 438/713 |

*Primary Examiner*—John Niebling
*Assistant Examiner*—Michael S. Lebentritt
*Attorney, Agent, or Firm*—Patterson & Streets, L.L.P.

[57] ABSTRACT

The present invention provides a plasma enhanced chemical vapor deposition method and apparatus for reducing the hydrogen concentration in amorphous silicon carbide films deposited on a substrate. The process combines a noble gas such as helium with a silicon source such as silane and a carbon source such as methane in the reaction zone of a CVD chamber. The resulting silicon carbide films have a low concentration of hydrogen and high compressive stress. The films are preferably produced with a plasma generated by a mixture of high and low radio frequency.

14 Claims, 5 Drawing Sheets

REDUCING HYDROGEN CONCENTRATION IN PECVD AMORPHOUS SILICON CARBIDE FILMS

BACKGROUND OF THE INVENTION

1. Field of the Invention

The present invention relates to a method and apparatus for reducing the hydrogen concentration in a silicon carbide film. More particularly, the present invention relates to a method and apparatus for reducing the concentration of hydrogen in silicon carbides film produced by plasma enhanced chemical vapor deposition.

2. Background of the Art

Silicon carbide (SiC) films are useful in the fabrication of integrated circuits and printer print heads to provide corrosion resistant and protective layers over structures formed thereon. Silicon carbide films can be deposited by physical vapor deposition (PVD) or chemical vapor deposition (CVD).

In physical vapor deposition, a target made of silicon carbide is located in a processing chamber opposite a substrate. A plasma is generated between the target and substrate by supplying an inert gas such as argon into the chamber and providing an electrical bias to the target and grounding the chamber walls and the support member. The plasma ionizes the argon gas and the ions bombard the surface of the target to sputter the target material which deposits onto the substrate. The composition of the resulting film is primarily determined by the composition of the target, therefore, PVD of silicon carbide provides films having very low concentrations of hydrogen incorporated therein. PVD of silicon carbide films, however, is typically a slow throughput.

CVD, while faster than PVD, typically requires decomposition of a film precursor or precursors including silicon and carbon sources which typically include hydrogen, thereby causing hydrogen to be incorporated into the film. Plasma-enhanced chemical vapor deposition (PECVD) is one process used in the manufacture of semiconductor devices for depositing SiC on various substrates. In PECVD of SiC, a substrate is placed in a vacuum deposition chamber equipped with a pair of parallel plate electrodes or other means of coupling electrical energy into the chamber, such as a helical coil. The substrate is generally mounted on a support member which is also the lower electrode. A flow of a reactant gas is provided in the deposition chamber through a gas inlet manifold which may also serve as the upper electrode. A radio frequency (RF) voltage is applied between the two electrodes to generate RF power sufficient to cause the reactant gas to form a plasma. The plasma causes the reactant gases to vigorously react and deposit a layer of the desired material on the surface of the substrate.

One PECVD process employed to deposit silicon carbide films involves the introduction of silane gas ($SiH_4$) and methane gas ($CH_4$) into a processing chamber where the gases react and form a film layer of silicon carbide on a substrate positioned in the chamber. In hydrogenated amorphous SiC films, three elements are typically present; silicon, carbon, and hydrogen; forming Si—C bonds, Si—H bonds, and C—H bonds. The ratio of Si—C bonds to other bonds is an important property of the film; a high ratio of Si—C bonds results in high film hardness, reduced surface roughness, and increased corrosion resistance. The ratio of Si—C bonds to other bonds is increased by raising the temperature of the wafer during the CVD process. However, the processing temperature is limited by melting points of integrated circuit structures and cannot be raised sufficiently to make a silicon carbide film having similar properties to a carbide film produced in a PVD process.

In light of the above, the present invention provides a CVD method and corresponding substrate processing system for depositing a silicon carbide film on a substrate at a satisfactory deposition rate while reducing the amount of hydrogen incorporated into the resulting film.

SUMMARY OF THE INVENTION

The present invention provides a silicon carbide (SiC) film having reduced hydrogen concentration. The SiC film is deposited on a substrate by introducing silane, methane gas, and a noble gas into a PECVD chamber and generating a plasma using RF power. The amount of hydrogen in the resulting silicon carbide film is inversely related to the amount of inert gas which is preferably helium or argon. The RF power is preferably a mixture of high and low frequency wherein the ratio of low frequency power to total power is less than about 0.6.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
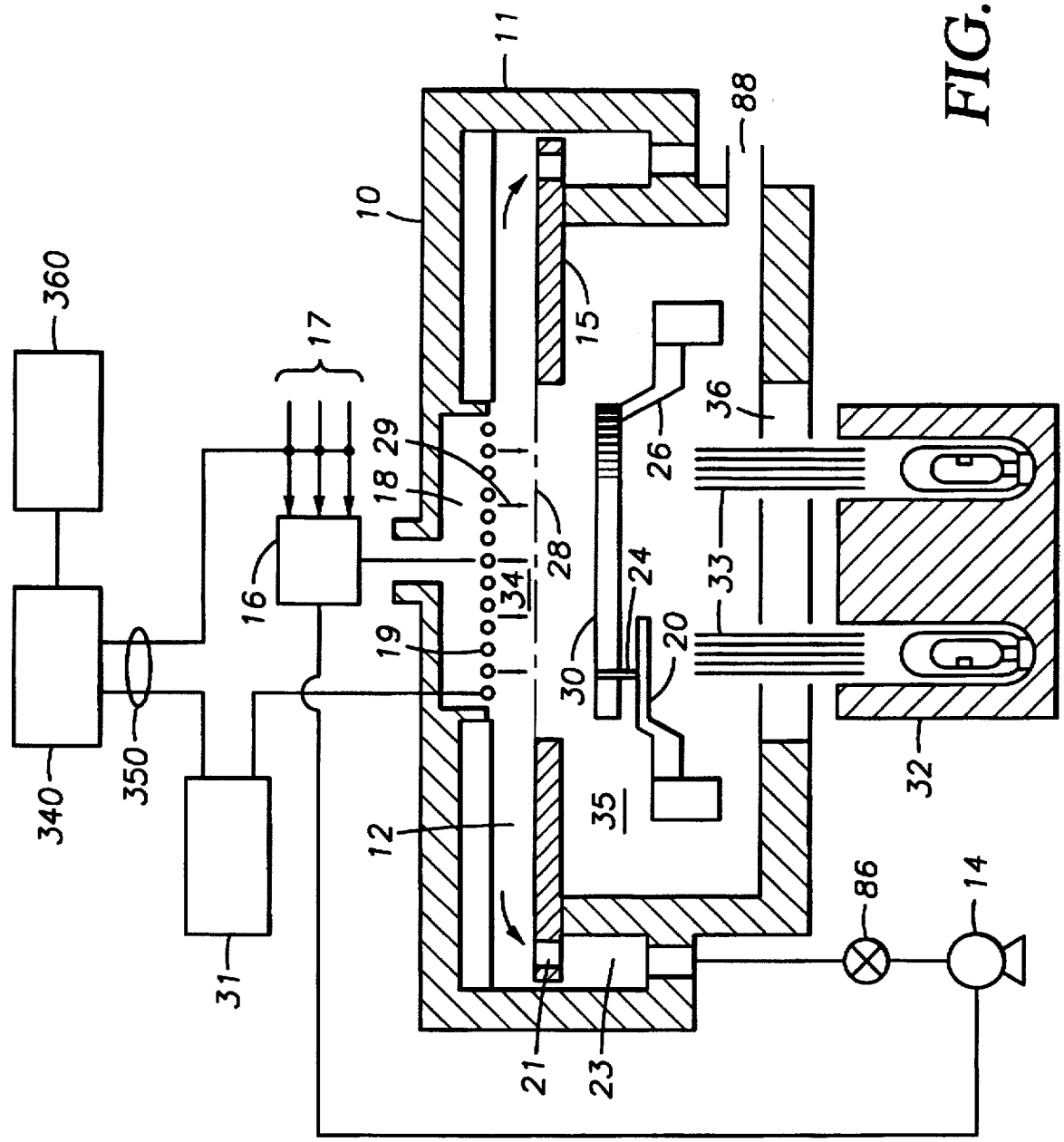
FIG. 1 is a schematic cross-sectional view of an exemplary CVD processing apparatus useful in the present invention.

The present invention is a method for depositing a silicon carbide film having a low hydrogen concentration onto a substrate in a CVD chamber, comprising the steps of providing a silicon source, a carbon source, and a noble gas in a reaction zone containing a substrate, and reacting the silicon source and the carbon source in the presence of a plasma to deposit a silicon carbide film on the substrate. The plasma is preferably generated by a mixture of high and low radio frequency wherein the ratio of the low frequency power to the total power is less than about 0.6. The silicon carbide films deposited by the PECVD process of this invention have significantly lower concentrations of hydrogen which result in higher compression stress in comparison to silicon carbide films deposited by the same process without a noble gas. The silicon carbide films can be deposited without a mixture of low and high radio frequency. However, the preferred mixture of high and low radio frequency corrects adverse film properties changes caused by the bombardment of the silicon carbide film with molecules of an inert gas. Increasing the ratio of Si—C bonds in the film provides greater hardness, reduced surface roughness, and increased corrosion resistance in silicon carbide films.

The invention includes a substrate processing system, comprising a vacuum chamber comprising a reaction zone, a substrate holder for positioning a substrate in the reaction zone, and a vacuum system; a gas distribution system connecting the reaction zone of the vacuum chamber to supplies of a silicon source, a carbon source, and a noble gas; an RF generator coupled to the gas distribution system for generating a plasma in the reaction zone; a controller comprising a computer for controlling the vacuum chamber, the gas distribution system, and the RF generator; and a memory coupled to the controller, the memory comprising a computer usable medium comprising a computer readable program code for selecting a plasma enhanced reaction of the silicon source and the carbon source in the presence of a noble gas to deposit a silicon carbide film.

In accordance with the method of the invention, the memory comprises computer readable program code for generating and maintaining a plasma from a mixture of the silicon source, the carbon source, and the noble gas using mixed frequency RF power wherein the low frequency power ratio of the total mixed frequency RF power is less than about 0.6. The memory further comprises program code for selection of a reaction zone pressure between about 1.5 to about 6.0 torr, program code for selection of a substrate temperature between about 150° C. to about 600° C. for the reaction of the silicon source and the carbon source, and program code for selection of a substrate holder position at a distance between about 300 mils and about 600 mils from a gas distribution plate for the deposition of the silicon carbide film.

Methods according to the invention can be carried out by programming conventional chemical vapor deposition (CVD) systems used to practice a known silicon carbide deposition process, without the need for modifications to the vacuum deposition chamber. For example, a method of the invention can be carried out using the apparatus provided by Applied Materials, Inc. of Santa Clara, Calif. and described by Wang et al. in U.S. Pat. No. 4,872,947, which patent is incorporated herein by reference. However, the methods of the present invention are not to be considered to be confined in their application to the use of such apparatus. In particular, the methods of the present invention may be carried out using a multi-chamber processing system rather than a single chamber processing system.

FIG. 1 depicts a schematic cross-sectional view of a CVD chamber 10 useful in the method of the present invention. The CVD chamber 10 generally includes chamber walls 11 defining deposition zone 12. A susceptor 30 is located in the chamber 10 to hold a substrate thereon and move the substrate to a raised position 28 within a baseplate 15 for processing. Lift pins 24 extend through the susceptor 30 and are actuated by lift 20 to position the tips of pins 24 above the surface of the susceptor to lift a substrate off of a robot blade (not shown). The susceptor 30 is then moved upwardly in the chamber by lift 26 while the lift pins 24 are lowered by lift 20 to position the substrate 28 on the susceptor 30. The susceptor may include an electrostatic or vacuum chuck for securing the substrate to the susceptor 30 during the deposition process.

A gas combining assembly 16 is provided in communication with the chamber 10 to mix reactant gases therein and to supply the mixed gases into an upper portion 18 of the chamber 10 above a face plate 19. The faceplate 19 distributes the mixed gases into the deposition zone 12 over the surface of the substrate as shown by arrows 29. A reaction zone 34 which is located between the face plate 19 and the susceptor 30 is created by radio frequency energy from an RF generator 31. The RF energy forms a plasma which enhances formation of silicon carbide. In one process application, the face plate 19 is electrically isolated from the chamber walls 11 so that a bias may be applied thereto to excite the gas in zone 34 into a plasma state. A vacuum exhaust 14 evacuates the chamber through holes 21 in the baseplate 15 which open into an annular manifold 23. The vacuum exhaust 14 establishes a desired pressure prior to deposition and thereafter exhausts the unreacted and reaction product gases from the chamber.

Heating means 32 maintains the support member 30 and the substrate 28 mounted thereon at a uniform temperature during processing. In the illustrated embodiment, heating means 32 is an external array of 1000 watt lamps directing collimated light 33 through quartz window 36. Other known heating means can also be employed. A particularly useful heating means 32 comprises resistive heating means rather than lamps. When resistive heating means are employed, quartz window 36 can be omitted. Thus, use of resistive heating means obviates the need for periodic cleaning and/or replacement of the quartz window, with attendant maintenance and downtime expenses.

The gas combining assembly 16 generally includes a gas box or plenum and one or more valves for controlling the flow of the various process gases 17, including purge gases, carrier gases, reactive gases for deposition of SiC or other materials, and cleaning gases such as $NF_3$ for periodic chamber cleaning processes. Alternatively, gas mixing assembly 16 may be omitted and all process gases delivered directly to the upper portion 18 of the chamber 10. This alternative may, however, result in greater non-uniformity and thus may be less preferred for certain applications.

Figure 2:
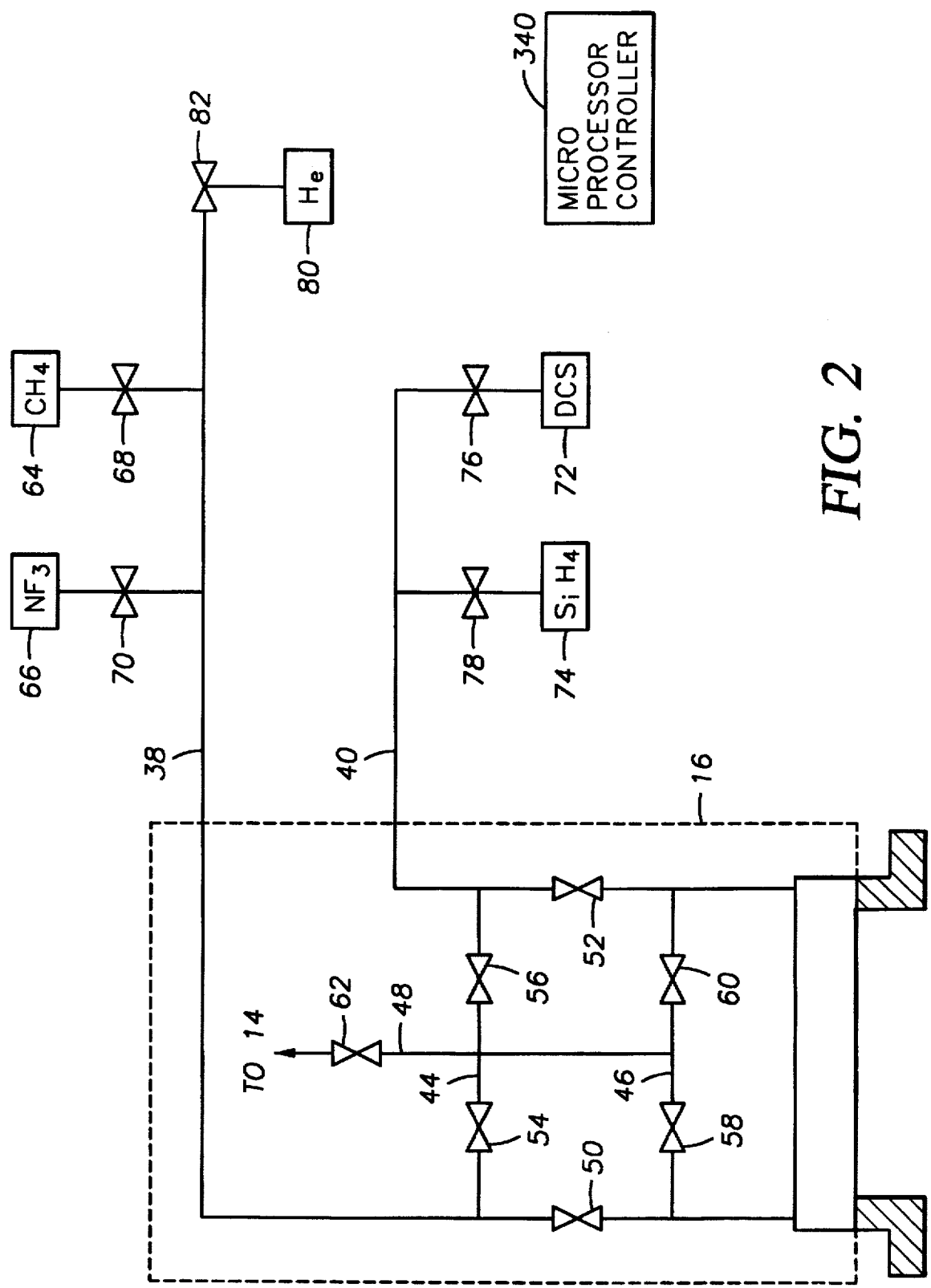
FIG. 2 is a schematic diagram of a preferred gas mixing assembly generally shown in FIG. 1.

FIG. 2 illustrates an exemplary gas combining assembly 16 for providing reactant and plasma gases to the gas distribution plate 18. Feed lines 38 and 40 deliver process gases into plenum 42 and subsequently into the upper portion 18 of the chamber 10. Feed lines 38 and 40 are linked by mixing lines 44 and 46, which in turn are joined by divert line 48. Valves 50 and 52 are disposed between mixing lines 44 and 46 on feed lines 38 and 40, respectively. Inlet mixing valves 54 and 56 are disposed on mixing line 44 as shown, and outlet mixing valves 58 and 60 are correspondingly disposed on mixing line 46. Divert valve 62 is disposed on divert line 48 and connects to the vacuum exhaust 14 to vent the process gases prior to deposition.

Sources of the process gases are connected to feed lines 38 and 40. When forming a SiC film it is preferred that carbon-containing gas sources are connected to one of the feed lines 38 and 40, while silicon-containing gas sources are connected to the remaining feed line to avoid reaction in the gas combining assembly 16. As shown in FIGS. 1 and 2, methane source 64 and $NF_3$ cleaning gas source 66 are connected to feed line 38 via supply valves 68 and 70, respectively. DCS source 72 and $SiH_4$ source 74 similarly are connected to feed line 40 via supply valves 76 and 78, respectively. Noble gas source 80, which preferably is a source of helium or argon, is connected to feed line 38 via supply valve 82.

Returning to FIG. 1, the deposition process begins with the entry of process gases 17 (i.e., reactant and carrier gases)

into the reaction zone 34 via gas combining assembly 16 and face plate 19. The process mixture for the present invention includes methane, silane and argon, where argon is the plasma gas. Gas combining assembly 16 mixes the process gases upstream ensuring that the gas mixture is of uniform composition before being supplied to the face plate 19. The face plate 19 has numerous openings over an area corresponding to that of the substrate beneath it. The spacing between the face plate 19 and the substrate can be adjusted to between about 200 and about 1000 mils (5–25 mm), to define the reaction zone 34. It is believed that decreased spacing between the face plate 19 and the substrate also reduces the hydrogen concentration within the SiC film.

A lower portion 35 of the chamber 10 is purged via bottom purge line 88 with a noble gas, preferably argon, to prevent reactive gases from extending into the lower portion 35 of the chamber 10 below the base plate 15.

The base pressure in the chamber 10 is typically from 1.5 to 6 torr. The pressure of the chamber is controlled by the exhaust system 14 fitted with a throttle valve 86.

A microprocessor controller 340 has a plurality of connections 350 to reactor components such as the RF generator 31 and the gas combining assembly 16. The microprocessor controller 340 has a memory 360 and controls all of the activities of the CVD apparatus. A preferred embodiment of the controller 340 includes a hard disk drive, a floppy disk drive, and a card rack. The card rack contains a single board computer (SBC), analog and digital input/output boards, interface boards and stepper motor controller boards. The system controller conforms to the Versa Modular Europeans (VME) standard which defines board, card cage, and connector dimensions and types. The VME standard also defines the bus structure having a 16-bit data bus and 24-bit address bus.

The controller 340 operates under the control of a computer program stored on the hard disk drive. The computer program dictates the timing, mixture of gases, RF power levels, substrate support position, and other parameters of a particular process. The process can be implemented using a computer program product 400 that runs on, for example, the system controller 340. The computer program code can be written in any conventional computer readable programming language such as for example 68000 assembly language, C, C ++, or Pascal. Suitable program code is entered into a single file, or multiple files, using a conventional text editor, and stored or embodied in a computer usable medium, such as a memory system of the computer. If the entered code text is in a high level language, the code is compiled, and the resultant compiler code is then linked with an object code of precompiled windows library routines. To execute the linked compiled object code, the system user invokes the object code, causing the computer system to load the code in memory, from which the CPU reads the executes the code to perform the tasks identified in the program.

Figure 3:
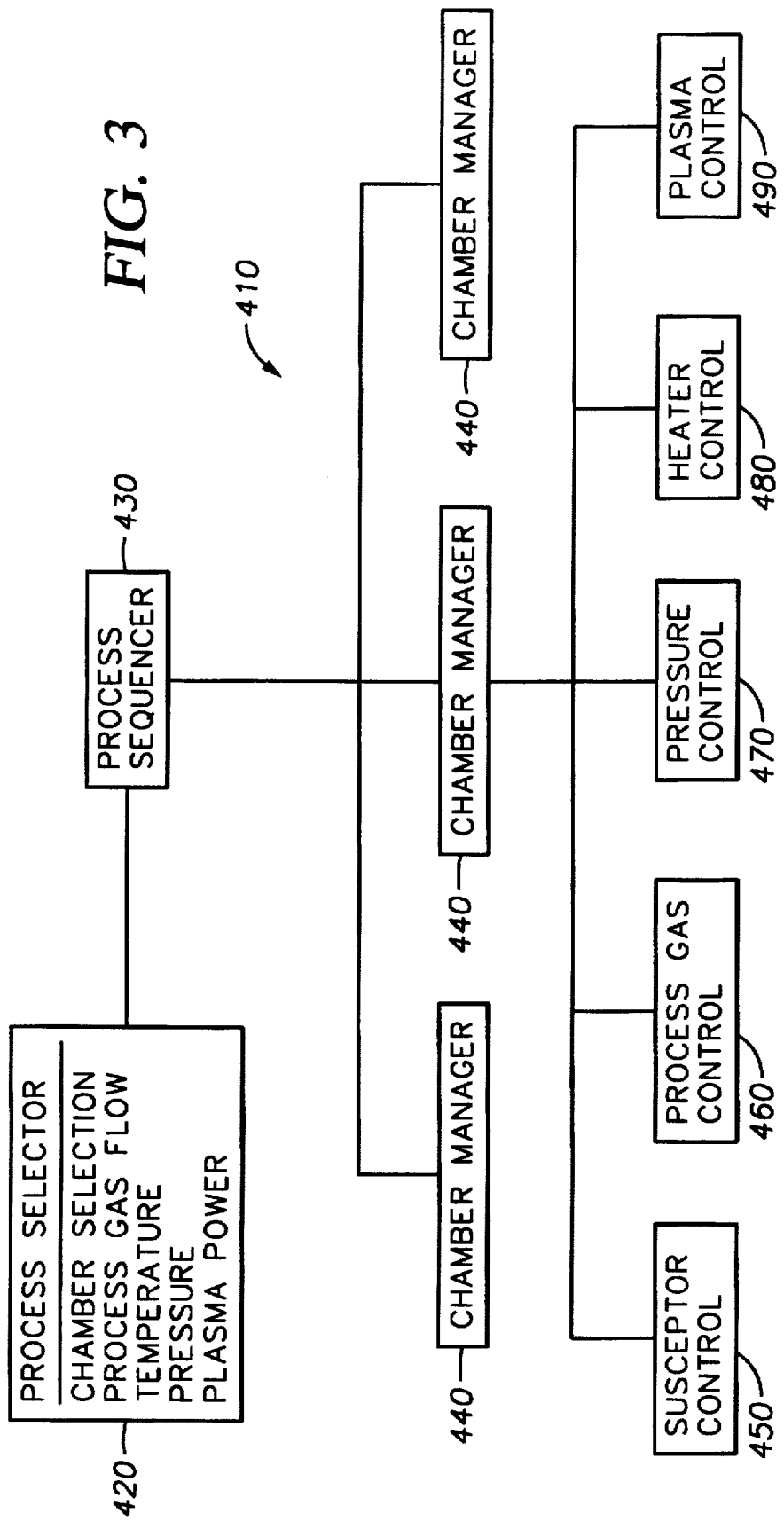
FIG. 3 is a diagram of a computer control program sequencer for operating the apparatus of FIGS. 1 and 2.

FIG. 3 shows an illustrative block diagram of the hierarchical control structure of the computer program 400. A user enters a process set number and process chamber number into a process selector subroutine 420 in response to menus or screens displayed on a CRT monitor by a light pen interface or equivalent means. The process sets are predetermined sets of process parameters necessary to carry out specified processes, and are identified by predefined set numbers. The process selector subroutine 420 identifies (i) the desired process chamber, and (ii) the desired set of process parameters needed to operate the process chamber for performing the desired process. The process parameters for performing a specific process relate to process conditions such as, for example, process gas composition and flow rates, temperature, pressure, plasma conditions such as RF bias power levels and magnetic field power levels, cooling gas pressure, and chamber wall temperature and are provided to the user in the form of a recipe. The parameters specified by he recipe are entered utilizing the lightpen/CRT monitor interface.

The signals for monitoring the process are provided by the analog input and digital input boards of system controller and the signals for controlling the process are output on the analog output and digital output boards of the controller 340.

A process sequencer subroutine 430 comprises program code for accepting the identified process chamber and set of process parameters from the process accepting the identified process chamber and set of process parameters from the process selector subroutine 420, and for controlling operation of the various process chambers. Multiple users can enter process set numbers and process chamber numbers, or a user can enter multiple process set numbers and process chamber numbers, so the sequencer subroutine 430 operates to schedule the selected processes in the desired sequence. Preferably the sequencer subroutine 430 includes a program code to perform the steps of (i) monitoring the operation of the process chambers to determine if the chambers are being used, (ii) determining what processes re being carried out in the chambers being used, and (iii) executing the desired process based on availability of a process chamber and type of process to be carried out. Conventional methods of monitoring the process chambers can be used, such a polling. When scheduling which process is to be executed, the sequencer subroutine 430 can be designed to take into consideration the present condition of the process chamber being used in comparison with the desired process conditions for a selected process, or the "age" of each particular user entered request, or any other relevant factor a system programmer desires to include for determining scheduling priorities.

Once the sequencer subroutine 430 determines which process chamber and process set combination is going to be executed next, the sequencer subroutine 430 causes execution of the process set by passing the particular process set parameters to one of several chamber manager subroutine 440 which controls multiple processing tasks in a CVD chamber 10 according to the process set determined by the sequencer subroutine 430. The chamber manager subroutine 440 controls execution of various chamber component subroutines which control operation of the chamber components necessary to carry out the selected process set. Examples of chamber component subroutines are susceptor control subroutine 450, process gas control subroutine 460, pressure control subroutine 470, heater control subroutine 480, and plasma control subroutine 490. Those having ordinary skill in the art would readily recognize that other chamber control subroutines can be included depending on what processes are desired. In operation, the chamber manager subroutine 440 selectively schedules or calls the process components subroutines in accordance with the particular process set being executed. The chamber manager subroutine 440 schedules the process component subroutines similarly to how the process sequencer 430 schedules which process equipment and process set is to be executed next. Typically, the chamber manager subroutine 440 includes steps of monitoring the various chamber components, determining which components needs to be operated based on the process parameters for the process set to be executed, and causing execution of a chamber component subroutine responsive to the monitoring and determining steps.

The process gas control subroutine 460 has program code for controlling process gas composition and flow rates. The process gas control subroutine 460 controls the open/close position of the safety shut-off valves, and also ramps up/down the mass flow controllers to obtain the desired gas flow rate. The process gas control subroutine 460 is invoked by the chamber manager subroutine 440, as are all chamber component subroutines, and receives from the chamber manager subroutine process parameters related to the desired gas flow rates. Typically, the process gas control subroutine 460 operations by opening the gas supply lines, and repeatedly (i) reading the necessary mass flow controllers, (ii) comparing the readings to the desired flow rates received from the chamber manager subroutine 440, and (iii) adjusting the flow rates of the gas supply lines as necessary. Furthermore, the process gas control subroutine 460 includes steps for monitoring the gas flow rates for unsafe rates, and activating the safety shut-off valves when an unsafe condition is detected.

In some processes, an inert gas such as argon is flowed into the chamber 10 to stabilize the pressure in the chamber before reactive process gases are introduced into the chamber. For these processes, the process gas control subroutine 460 is programmed to include steps for flowing the inert gas into the chamber 10 for an amount of time necessary to stabilize the pressure in the chamber, and then the steps described above would be carried out.

The pressure control subroutine 470 comprises program code for controlling the pressure in the chamber 10 by regulating the size of the opening of valves in the exhaust system of the chamber. When the pressure control subroutine 470 is invoked, the desired, or target, pressure level is received as a parameter from the chamber manager subroutine 440. The pressure control subroutine 470 operates to measure the pressure in the chamber 10 by reading one or more conventional pressure nanometers connected to the chamber, compare the measure value(s) to the target pressure, obtain PID (proportional, integral, and differential) values from the stored pressure table corresponding to the target pressure, and adjust the valves according to the PID values obtained from the pressure table. Alternatively, the pressure control subroutine 470 can be written to open or close the valves to a particular opening size to regulate the chamber 10 to the desired pressure.

The heater control subroutine 480 comprises program code for controlling the temperature of the chamber 10. The heater control subroutine 480 is invoked by the chamber manager subroutine 440 and receives a target, or setpoint, temperature parameter. The heater control subroutine 480 measures the temperature by measuring voltage output of thermocouple located in the chamber 60, compares the measured temperature to the setpoint temperature, and increases or decreases current applied to the lamp module 32 or other heating components to obtain the setpoint temperatures. The temperature is obtained from the measured voltage by looking up the corresponding temperature in a stored conversion table, or by calculating the temperature using a fourth order polynomial.

The above CVD system description is mainly for illustrative purposes, and other CVD equipment may be employed. Additionally, variations of the above described system such as variations in subsequent support design, heater design, and other designs are possible.

The silicon carbide deposition process is generally carried out by positioning a substrate on the support member and locating the substrate a distance from about 200 to about 1000 mils from the face plate 19, preferably from about 300 to about 600 mils. The chamber is then pumped down to about 0.01 to 0.1 Torr and then the reactant gases are inlet into the chamber and the pressure increased to about 2.5 Torr to about 5.5 Torr, preferably about 5 Torr. The substrate is heated to a temperature from about 150° C. to about 600° C.

The reactant gases are then allowed to flow into the upper portion 18 of the chamber 10. In a typical process, the flow rates of process gases into chamber 10 are related to the volume of the chamber. For an exemplary apparatus including a chamber adapted to process a semiconductor wafer having a diameter of 8" (200 mm), a typical chamber volume is about 6 L. A semiconductor wafer having a diameter of 6" (150 mm) can also be processed in a chamber of this volume. For such an apparatus, an appropriate flow rate of methane is about 200–5000 sccm, preferably at about 3500 sccm. Silane is passed into chamber 10 at a flowrate of between about 80 and about 200 sccm, preferably at about 120 sccm. The various flowrates can be adjusted depending on the processing equipment in which the SiC film is deposited to obtain a silicon carbide layer having a low hydrogen concentration. The flow rates provided are only representative and may vary between systems.

Mixed RF frequency power is provided to the gas distribution plate by providing a high frequency (e.g., about 13.56 MHz) and a low frequency (e.g., about 350 KHz) power generator. A suitable high frequency power generator is provided by ENI as model no. OEM-1213 and a suitable low frequency power generator is provided by RF Power Products as model no. LF-50. The RF generators are connected through an RF cable to an RF match network which in turn is connected to face plate 19 through a suitable feed-through.

In accordance with the present invention, high frequency RF power from about 10 to about 15 MHz, preferably from 13 to 14 MHz, and low frequency RF power from about 150 to about 450 KHz, preferably from 325 to 375 KHz, are provided to the face plate 19 to generate the plasma within the chamber. The mixed frequency RF power preferably has a low frequency power ratio less than about 0.6 and is applied to the face plate 19 to excite the plasma gas into an excited state. It has been found that the hydrogen concentration within the film can be decreased by manipulating the low frequency power ratio (LFRF power/total RF power) provided under computer control. It is believed that the low frequency RF provides a plasma having a higher energy. Various radicals of the silicon and carbon sources are produced within the plasma and various species deposit on the substrate.

The process of the present invention is readily conducted on the apparatus described above using a silicon source gas such as silane ($SiH_4$), a carbon source gas such as methane ($CH_4$), and a noble gas, preferably helium or argon. Helium can be added to the reactive gases to form up to 50% by volume of the gases supplied to the chamber. Dependent on the system design, the flowrates are preferably from 500 to 4000 cc/min of helium, from 50 to 300 cc/min of silane, and from 1000 to 4000 cc/min of methane. The process is described in more detail in the following examples which compare a PECVD for depositing silicon carbide with and without a noble gas.

As an exemplary process for growing a silicon carbide film on a substrate according to the present invention, the following set of parameters were used:

| | |
|---|---|
| Gas = | $SiH_4$ and $CH_4$ |
| Pressure = | 5.0 Torr |
| Power = | HFRF = 200 W and LFRF = 200 W |
| Gas Flow = | $SiH_4$ = 120 sccm and $CH_4$ = 3200 sccm |
| Substrate Support Temperature = | 400° C. |

-continued

| | |
|---|---|
| Substrate Temperature = | 370° C. |
| Growth Rate = | 5000 Å |

COMPARATIVE EXAMPLES 1–5

In a known PECVD process, methane and silane are mixed in gas combining assembly 16 for deposition of a silicon carbide film on a substrate. Methane is introduced from source 64 into gas combining assembly 16 through feed line 38 by opening supply valve 68. Silane from source 74 is introduced into gas combining assembly 16 through feed line 40 by opening supply valve 78.

Mixing of the process gases is effected in gas combining assembly 16 by closing valves 50 and 52 and outlet mixing valves 58 and 60, and opening inlet mixing valves 54 and 56 and divert valve 62. The gases partially mix in mixing line 44, and initially flow through divert line 48 to exhaust system 14 until the flow is stabilized. After stabilization, divert valve 62 is closed and outlet mixing valves 58 and 60 are opened. The partially mixed gases return through mixing line 46 to feed lines 38 and 40, then enter plenum 42 where mixing is completed. The mixed process gases subsequently enter the upper portion 18 of the chamber 10.

Five experiments were conducted at a chamber pressure of 5 Torr and a chamber temperature of 400° C. The flowrate of methane was 3600 cc/min and the flowrate of silane was 135, 150, 155, 160, and 175 cc/min for Comparison Examples 1–5, respectively. The substrate surface was positioned 450 mil from the face plate 19. A plasma was struck in the chamber using 200 w of high frequency RF power of about 13.56 MHz and 200 w of low frequency RF power of about 350 KHz. Deposition proceeded for about 80 to 100 seconds until a refractive index of about 2.5 was measured for a silicon carbide film. Absorption band areas were determined from infrared spectra and the results were normalized for a 1 micron thick film as shown in Table 1. Compression stress and uniformity for the film were measured by Flexus 2100 stress gauge and Tencor UV1250, respectively. The results are also shown in Table 1.

EXAMPLES 1–5

Helium was combined with the methane and silane gases for comparison with Comparative Examples 1–5.

Five experiments were conducted at a chamber pressure of 5 Torr and a chamber temperature of 400° C. The flowrate of helium was 2,000 cc/min the flowrate of methane was 3600 cc/min, and the flowrate of silane was 115, 120, 127, 135, and 155 cc/min for Examples 1–5, respectively. The substrate surface was positioned 450 mil from the face plate 19. A plasma was struck in the chamber using 200 w of high frequency RF power of about 13.56 MHz and 200 w of low frequency RF power of about 350 KHz. Deposition proceeded for about 100 to 130 seconds until a refractive index of about 2.5 was measured for a silicon carbide film. Absorption band areas were determined as described for Comparative Examples 1–5 and are reported in Table 2. Compression stress and uniformity for the films are also shown in Table 2.

TABLE 2

| Example | Refractive Index | Thickness Å | Si-C Band Area | Si-H Band Area | Si-C to Si-H | Stress | Uniformity |
|---|---|---|---|---|---|---|---|
| E1 (DD13) | 2.49 | 5920 | 104.2 | 4.30 | 24.2 | −5.5 | 1.5 |
| E2 (D13) | 2.49 | 5510 | 124.0 | 4.92 | 25.2 | −5.1 | 1.7 |
| E3 (D14) | 2.51 | 5680 | 92.2 | 4.05 | 22.8 | −4.8 | 1.7 |
| E4 (D12) | 2.53 | 4830 | 139.7 | 5.40 | 25.8 | −4.6 | |
| E5 (DD23) | 2.57 | 5250 | 104.7 | 5.04 | 20.8 | −4.3 | 2.0 |

EXAMPLES 6–8

Helium was combined with the methane and silane gases for comparison with Comparative Examples 1–5.

Three experiments were conducted at a chamber pressure of 5 Torr and a chamber temperature of 400° C. The flowrate of helium was 3,000 cc/min, the flowrate of methane was 3600 cc/min, and the flowrate of silane was 100, 105, and 135 cc/min for Examples 6–8, respectively. The substrate surface was positioned 450 mil from the face plate 19. A plasma was struck in the chamber using 200 w of high frequency RF power of about 13.56 $MH_z$ and 200 w of low frequency RF power of about 350 KHz. Deposition proceeded for about 140 to 180 seconds until a refractive index of about 2.5 was measured for a silicon carbide film. Absorption band areas were determined as described for Comparative Examples 1–5 and are reported in Table 3. Compression stress and uniformity for the films are also shown in Table 3.

TABLE 1

| Comparison Example | Refractive Index | Thickness Å | Si-C Band Area | Si-H Band Area | Si-C to Si-H | Stress | Uniformity |
|---|---|---|---|---|---|---|---|
| C1 (DD10) | 2.43 | 6560 | 100.6 | 5.19 | 19.4 | −2.2 | 0.7 |
| C2 (D8) | 2.47 | 6910 | 97.3 | 5.56 | 17.5 | −1.7 | 2.0 |
| C3 (DD18) | 2.48 | 6130 | 99.0 | 5.86 | 16.9 | −1.7 | 0.8 |
| C4 (DD12) | 2.49 | 6240 | 96.5 | 6.06 | 15.9 | −1.6 | 0.7 |
| C5 (DD20) | 2.53 | 5750 | 94.6 | 5.76 | 16.4 | −0.9 | 0.8 |

TABLE 3

| Example | Refractive Index | Thickness Å | Si-C Band Area | Si-H Band Area | Si-C to Si-H | Stress | Uniformity |
|---|---|---|---|---|---|---|---|
| E6 (DD24) | 2.48 | 6700 | 101.4 | 3.62 | 28.0 | −7.7 | 2.0 |
| E7 (DD14) | 2.50 | 6800 | 101.4 | 3.87 | 26.2 | −6.9 | 1.4 |
| E8 (DD11) | 2.57 | 6010 | 106.2 | 4.31 | 24.7 | −5.4 | 1.4 |

EXAMPLES 9–11

Helium was combined with the methane and silane gases for comparison with Comparative Examples 1–5.

Three experiments were conducted at a chamber pressure of 5 Torr and a chamber temperature of 400° C. The flow rate of helium was 3,000 cc/min, the flow rate of methane was 4,500 cc/min, and the flow rate of silane was 120, 135, and 135 cc/min for Examples 9–11, respectively. The substrate surface was positioned 450 mil from the face plate 19 except for Experiment 11 which was 400 mil. A plasma was struck in the chamber using 200 w of high frequency RF power of about 13.56 $MH_z$ and 200 w of low frequency RF power of about 350 KHz. Deposition proceeded for about 100 to 110 seconds until a refractive index of about 2.5 was measured for a silicon carbide film. Absorption band areas were determined as described for Comparative Examples 1–5 and are reported in Table 4. Compression stress and uniformity for the films are also shown in Table 4.

TABLE 4

| Example | Refractive Index | Thickness Å | Si-C Band Area | Si-H Band Area | Si-C to Si-H | Stress | Uniformity |
|---|---|---|---|---|---|---|---|
| E9 (D22) | 2.48 | 4520 | 106.1 | 4.03 | 26.3 | −7.1 | 1.6 |
| E10 (D16) | 2.51 | 4300 | 110.3 | 4.77 | 23.1 | −6.4 | 1.3 |
| E11 (D17) | 2.52 | 4190 | 113.5 | 4.67 | 24.3 | −7.1 | 1.6 |

EXAMPLE 12

Helium was combined with the methane and silane gases for comparison with Comparative Examples 1–5.

One experiment was conducted at a chamber pressure of 5 Torr and a chamber temperature of 400° C. The flow rate of helium was 5,000 cc/min, the flow rate of methane was 3,600 cc/min, and the flow rate of silane was 100 cc/min. The substrate surface was positioned 450 mil from the face plate 19. A plasma was struck in the chamber using 200 w of high frequency RF power of about 13.56 $MH_z$ and 200 w of low frequency RF power of about 350 KHz. Deposition proceeded for about 250 seconds until a refractive index of about 2.5 was measured for a silicon carbide film. Absorption band areas were determined as described for Comparative Examples 1–5 and are reported in Table 5. Compression stress and uniformity for the film are also shown in Table 5.

EXAMPLES 13–14

Helium was combined with the methane and silane gases for comparison with Comparative Examples 1–5.

Two experiments were conducted at a chamber pressure of 5 Torr and a chamber temperature of 400° C. The flow rate of helium was 1,000 cc/min, the flow rate of methane was 3,600 cc/min, and the flow rate of silane was 150 and 135 cc/min for Examples 13–14, respectively. The substrate surface was positioned 450 mil from the face plate 19. A plasma was struck in the chamber using 200 w of high frequency RF power of about 13.56 $MH_z$ and 200 w of low frequency RF power of about 350 KHz. Deposition proceeded for about 100 seconds until a refractive index of about 2.5 was measured for a silicon carbide film. Absorption band areas were determined as described for Comparative Examples 1–5 and are reported in Table 5. Compression stress and uniformity for the films are also shown in Table 5.

Figure 4:
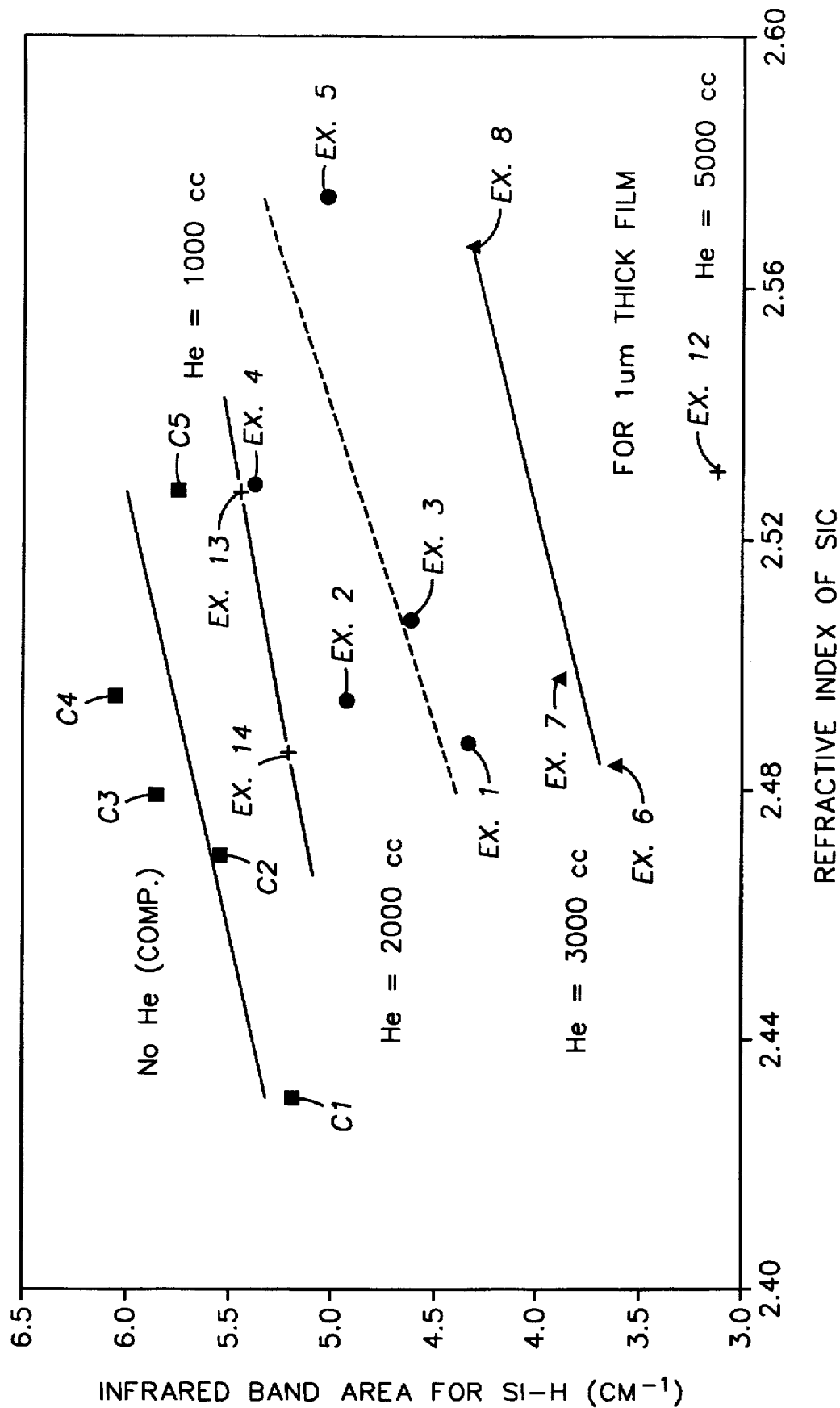
FIG. 4 is a graph depicting the hydrogen concentration in experimental SiC films as a function of the concentration of He in the CVD apparatus.
Figure 5:
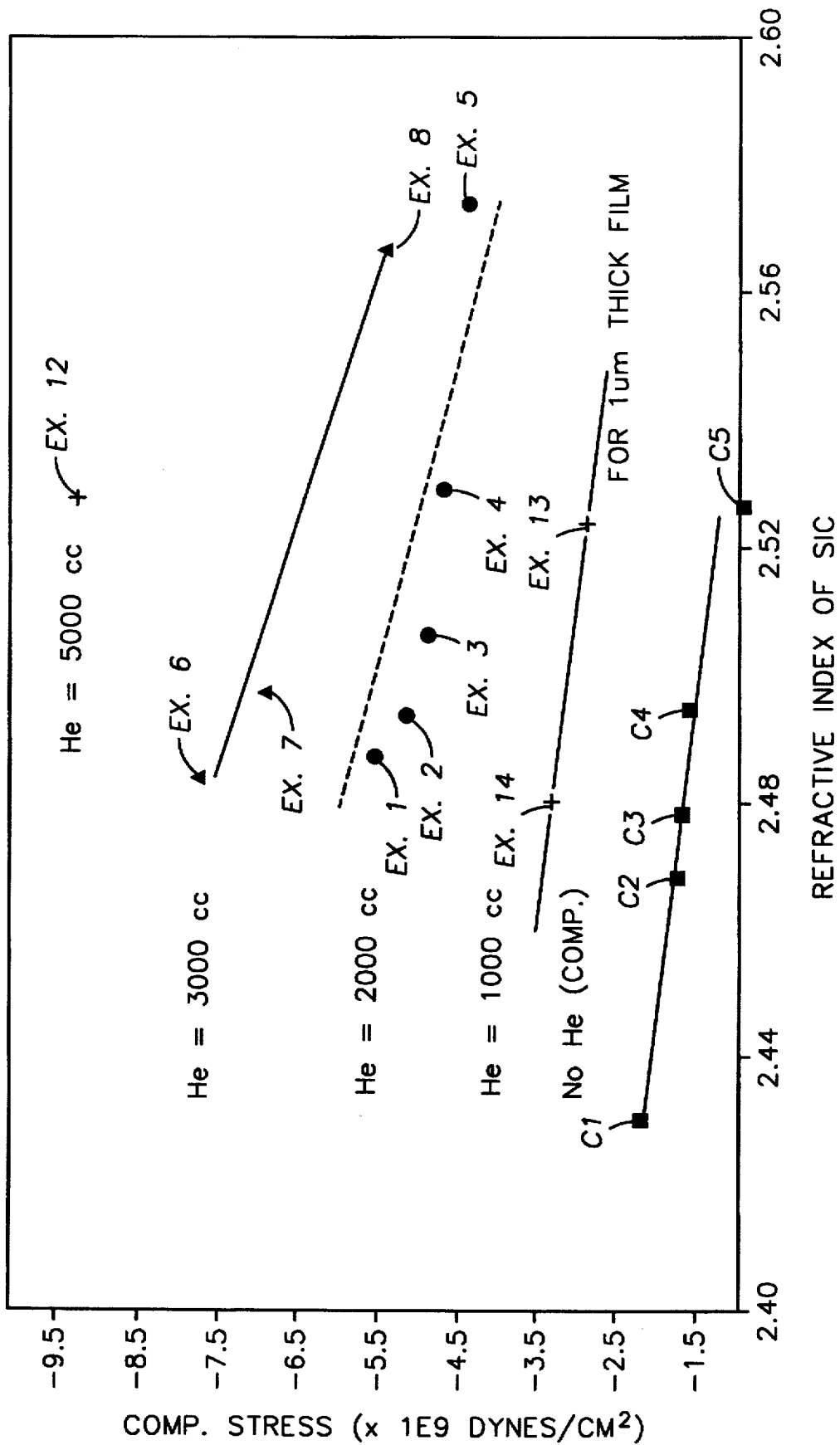
FIG. 5 is a graph depicting the compression stress in experimental SiC films as a function of the concentration of He in the CVD apparatus.

The effect of the noble gas on the hydrogen concentration of the silicon carbide films is shown in FIGS. 4 and 5 which plot the results for the preceding examples having a methane flow rate of 3,600 cc/min. The plots also show that a decrease in the flow rate of silane lowers the hydrogen concentration in the film with or without a noble gas. However, reduced silane flow also raises the carbon content of the film in comparison to silicon. The data in FIGS. 4 and 5 is best compared by selecting a silane flow rate and locating its position for the various helium flow rates. Such a comparison consistently shows that hydrogen concentration decreases and compressive stress increases as the flow of noble gas increases.

EXAMPLES 15–19

Helium was combined with the methane and silane gases at varying chamber temperatures.

TABLE 5

| Example | Refractive Index | Thickness Å | Si-C Band Area | Si-H Band Area | Si-C to Si-H | Stress | Uniformity |
|---|---|---|---|---|---|---|---|
| E12 (DD25) | 2.53 | 6990 | 102.8 | 3.08 | 33.4 | −9.2 | 8.1 |
| E13 (D10) | 2.53 | 5700 | 107.1 | 5.53 | 19.3 | −2.9 | 1.5 |
| E14 (D11) | 2.48 | 5550 | 121.5 | 5.26 | 23.1 | −3.3 | 1.5 |

Five experiments were conducted at a chamber pressure of 4 Torr and chamber temperatures of 400°, 434°, 434°, 434°, and 480° C. for Examples 15–19, respectively. The flow rate of helium was 3,000 cc/min, the flow rate of methane was 4,500 cc/min, and the flow rate of silane was 110, 100, 110, 90, and 90 cc/min for Examples 15–19, respectively. The substrate surface was positioned 450 mil from the face plate 19. A plasma was struck in the chamber using 200 w of high frequency RF power of about 13.56 MH$_z$ and 200 w of low frequency RF power of about 350 KHz. Deposition proceeded for about 170 to 240 seconds until a refractive index of about 2.5 was measured for a silicon carbide film. Absorption band areas were determined as described for Comparative Examples 1–5 and are reported in Table 6. Compression stress and uniformity for the films are also shown in Table 6.

EXAMPLES 23 and 25

Helium was combined with the methane and silane gases at varying positions of the substrate.

Two experiments were conducted at a chamber pressure of 4.5 Torr and a chamber temperature of 400° C. The flow rate of helium was 3,000 cc/min, the flow rate of methane was 4,500 cc/min, and the flow rate of silane was 120 cc/min. The substrate surface was positioned 450 mil and 510 mil from the face plate 19 for Examples 23 and 25, respectively. A plasma was struck in the chamber using 200 w of high frequency RF power of about 13.56 MH$_z$ and 200 w of low frequency RF power of about 350 KHz. Deposition proceeded for about 130 to 140 seconds until a refractive index of about 2.5 was measured for a silicon carbide film.

TABLE 6

| Example | Refractive Index | Thickness Å | Si-C Band Area | Si-H Band Area | Si-C to Si-H | Stress | Uniformity |
|---|---|---|---|---|---|---|---|
| E15 (DD7) | 2.53 | 4990 | 107.2 | 3.48 | 30.8 | −9.4 | 2.0 |
| E16 (DD6) | 2.37 | 3360 | 148.8 | 3.60 | 41.3 | −15.1 | 2.1 |
| E17 (DD15) | 2.56 | 6460 | 113.3 | 2.70 | 41.9 | −9.8 | 1.7 |
| E18 (DD16) | 2.52 | 6130 | 101.5 | 2.48 | 40.9 | −3.9 | 1.9 |
| E19 (DD17) | 2.58 | 5620 | 117.4 | 2.34 | 50.2 | −11.7 | 1.4 |

EXAMPLES 9, 10, 15 and 20–24

Helium was combined with the methane and silane gases at varying chamber pressures.

Eight experiments were conducted at a chamber temperature of 400° C. and a pressure of 4 Torr for Examples 15 and 20–22, 4.5 Torr for Example 23, and 5 Torr for Examples 9–10 and 24. The flow rate of helium was 3,000 cc/min, the flow rate of methane was 4,500 cc/min, and the flow rate of silane was 80 cc/min for Example 20, 100 cc/min for Example 21, 110 cc/min for Example 15, 120 cc/min for Examples 9 and 22–23, and 135 cc/min for Examples 10 and 24. The substrate surface was positioned 450 mil from the face plate 19. A plasma was struck in the chamber using 200 w of high frequency RF power of about 13.56 MH$_z$ and 200 w of low frequency RF power of about 350 KHz. Deposition proceeded for about 100 to 180 seconds until are fractive index of about 2.5 was measured for a silicon carbide film. Absorption band areas were determined as described for Comparative Examples 1–5 and are reported in Table 7. Compression stress and uniformity for the films are also shown in Table 7.

Absorption band areas were determined as described for Comparative Examples 1–5 and are reported in Table 8. Compression stress and uniformity for the films are also shown in Table 8.

TABLE 7

| Example | Refractive Index | Thickness Å | Si-C Band Area | Si-H Band Area | Si-C to Si-H | Stress | Uniformity |
|---|---|---|---|---|---|---|---|
| E20 (DD3) | 2.46 | 4820 | 85.2 | 3.28 | 26.0 | −2.6 | 1.9 |
| E21 (DD1) | 2.50 | 4820 | 97.2 | 3.55 | 27.3 | −10 | 2.2 |
| E15 (DD7) | 2.53 | 4990 | 107.2 | 3.48 | 30.8 | −9.4 | 2.0 |
| E22 (D24) | 2.53 | 4500 | 111.2 | 3.65 | 30.5 | −10 | 2.2 |
| E23 (D23) | 2.51 | 4650 | 105.5 | 3.84 | 27.5 | −8.3 | 1.9 |
| E9 (D22) | 2.48 | 4520 | 106.1 | 4.03 | 26.3 | −7.1 | 1.6 |
| E24 (D15) | 2.48 | 4810 | 112.3 | 4.89 | 22.9 | −5.4 | 1.5 |
| E10 (D16) | 2.51 | 4300 | 110.3 | 4.77 | 23.1 | −6.4 | 1.3 |

TABLE 8

| Example | Refractive Index | Thickness Å | Si-C Band Area | Si-H Band Area | Si-C to Si-H | Stress | Uniformity |
|---|---|---|---|---|---|---|---|
| E23 (D23) | 2.51 | 4650 | 105.5 | 3.35 | 27.5 | −8.3 | 1.9 |
| E25 (D25) | 2.50 | 5110 | 109.7 | 3.90 | 28.1 | −7.8 | 1.8 |

COMPARATIVE EXAMPLES 6–8

In a known PECVD process, the power ratio of low and high radio frequency was varied to determine the effect on hydrogen content of silicon carbide films.

Three experiments were conducted at a chamber pressure of 5.5 Torr and a chamber temperature of 400° C. The flow rate of methane was 3600 cc/min and the flow rate of silane was 140 cc/min. The substrate surface was positioned 450 mil from the face plate 19. A plasma was struck in the chamber using 300, 200, and 100 w of high frequency RF power of about 13.56 MH$_z$ for Comparative Examples 6–8, respectively, and 100, 200, and 300 w of low frequency RF power of about 350 KHz for Comparative Examples 6–8, respectively. Deposition proceeded for about 80 seconds until a refractive index of about 2.5 was measured for a silicon carbide film. Absorption band areas were determined as described for Comparative Examples 1–5 and the results are reported in Table 9. Compression stress and uniformity are also shown in Table 9.

TABLE 9

| Comparison Example | Refractive Index | Thickness Å | Si-C Band Area | Si-H Band Area | Si-C to Si-H | Stress | Uniformity |
|---|---|---|---|---|---|---|---|
| C6 (D1) | 2.43 | 4960 | 95.7 | 6.91 | 13.9 | −1.5 | 0.3 |
| C7 (D2) | 2.41 | 5460 | 102.0 | 6.17 | 16.5 | −1.8 | 0.8 |
| C8 (D3) | 2.41 | 4120 | 143.1 | 7.32 | 19.5 | −4.3 | 15 |

While the foregoing is directed to the preferred embodiments of the present invention, other and further embodiments of the invention may be devised without departing from the basic scope thereof, and the scope thereof is determined by the claims which follow.

I claim:

1. A method for depositing a silicon carbide film onto a substrate, comprising the steps of:
   providing a silicon source, a carbon source, and a noble gas in a reaction zone containing a substrate; and
   reacting the silicon source and the carbon source in the presence of a plasma to deposit a silicon carbide film on the substrate;
   wherein the plasma is generated using mixed frequency RF power.

2. The method of claim 1, wherein a ratio of low frequency RF power to total mixed frequency RF power is less than about 0.6.

3. The method of claim 1, wherein the carbon source is methane, the silicon source is silane, and the noble gas is helium.

4. The method of claim 1, wherein the reaction of the silicon source and the carbon source is carried out at a reaction zone pressure between about 1.5 and about 6.0 torr.

5. The method of claim 1, wherein the reaction of the silicon source and the carbon source is carried out at a substrate temperature of between about 150° C. and about 600° C.

6. The method of claim 1, wherein the high frequency RF power is selected from about 10 to about 15 MHz and the low frequency RF power is selected from about 150 to about 450 KHz.

7. The method of claim 2, wherein the low frequency RF power is selected from 325 to 375 KHz.

8. The method of claim 2, wherein the high frequency RF power is selected from 13 to 14 MHz.

9. A method for plasma enhanced chemical vapor deposition of a silicon carbide film having a reduced concentration of hydrogen onto a substrate surface, comprising the steps of:
   supplying a noble gas and reactant gases comprising a silicon source and a carbon source into a deposition chamber containing a substrate;
   applying a radio frequency bias sufficient to generate a plasma adjacent a surface of the substrate; and
   reacting the silicon source and the carbon source in the presence of the plasma to deposit a silicon carbide film on the surface of the substrate;
   wherein the radio frequency bias comprises a high frequency bias and a low frequency bias.

10. The method of claim 9, wherein the high frequency bias is from about 10 to about 15 MHz and the low frequency bias is from about 150 to about 450 KHz.

11. The method of claim 10, wherein a ratio of low frequency RF power to total RF power is less than about 0.6.

12. An improved plasma enhanced chemical vapor deposition process comprising the steps of supplying reactant gases comprising a silicon source and a carbon source into a deposition chamber containing a substrate, applying a radio frequency bias sufficient to generate a plasma adjacent a surface of the substrate, and reacting the silicon source and the carbon source in the presence of the plasma to deposit a silicon carbide film on the surface of the substrate, the improvement comprising the steps of supplying a noble gas with the reactant gases, and coupling a mixed radio frequency bias into the chamber.

13. The improved process of claim 12, wherein the mixed radio frequency bias comprises a high frequency RF bias from 13 to 14 MHz and a low frequency RF bias from 325 to 375 KHz.

14. The process of claim 13, wherein a ratio of low frequency RF power from the low frequency RF bias to the total power from both the low frequency RF bias and the high frequency RF bias is less than about 0.6.

* * * * *

UNITED STATES PATENT AND TRADEMARK OFFICE
CERTIFICATE OF CORRECTION

PATENT NO. : 5,800,878

DATED : September 1, 1998

INVENTOR(S) : Xiang Yu Yao

It is certified that error appears in the above-identified patent and that said Letters Patent is hereby corrected as shown below:

In column 1, line 66, after "the" please delete "water" and replace it with --wafer--.

Signed and Sealed this

Third Day of August, 1999

Attest:

Attesting Officer

Q. TODD DICKINSON

Acting Commissioner of Patents and Trademarks